3,201,222
PROCESS FOR MAKING A SOIL FERTILIZING AND SOIL BUFFERING PRODUCT
Harold W. Wilson, El Paso, Tex., assignor to Wilson Laboratories, Inc., El Paso, Tex., a corporation of Texas
No Drawing. Filed Oct. 23, 1962, Ser. No. 232,576
5 Claims. (Cl. 71—45)

This invention relates to an agricultural soil buffer material and to the process for preparing said material. More particularly it relates to a solid material from which soil buffering agents are released when moisture present in the soil reacts with the solid material after it has been applied to the soil.

In an earlier United States Patent No. 2,927,851 issued March 8, 1960, I have described a process for making a soil fertilizing and soil improving gel product by a process which comprised treating a slag such as that obtained from the process of refining copper in a reverberatory furnace, with a concentrated acid in the presence of sufficient water to promote the hydrolysis of silicates and the acid solubilization of the iron and other free metals present in the slag. The resulting solid dry gelatinous hydrous silicate product was solely suited for application on alkaline (calcareous) soils and to provide a fertilizing material of high equivalent acidity.

It has now been found that a product suitable for the treatment of both alkaline and acid soils may be formed by reacting similar slag materials with a suitable amount of concentrated orthophosphoric acid, without the separate addition of any extra water, and by thereafter maintaining the product resulting from the slag-acid reaction at an elevated temperature for a time interval sufficient to permit all of the iron values originally present in the slag, both as metallic iron and as various iron oxides to be converted to iron salts of orthophosphoric acid.

The terms "buffer" and "buffering" as employed throughout this disclosure refer to a chemical substance and the action of such chemical substance, which is composed of a combination of weakly ionized acid and one or more of its salts, and the action of such chemical substance in having a capacity and an ability to maintain a nearly constant oxonium ion concentration in the system in which it is present, even in the presence of moderate quantities or additions of either strongly acidic or strongly basic substances.

One object of this invention is the production of a material produced by the process hereinafter described and which acts as a soil buffer.

Another object of the invention is the production of a soil treating material having additional valuable properties which are attributed to the chemical elements and compounds present plus their resultant physical and chemical properties when added to a soil system.

It is another object of this invention to produce a solid material containing highly water-insoluble crystalline orthophosphate salts, which salts are capable in the presence of soil moisture containing soluble acidic or alkaline salts over long periods of time (several months to years), to raise or lower and to thus control the concentration of hydrogen ion in the soil system through the ability of such orthophosphate salts to be decomposed and reformed into alkali or acid orthophosphates.

Still another object of this invention is to produce a solid material having in addition to the above noted soil buffering properties, the ability to provide at least most of the following plant nutrients: phosphorus, iron, calcium, magnesium, manganese, zinc, molybdenum, boron, nickel and copper in forms and amounts utilized by growing plants over long time periods in soils treated with said material.

Simply stated, the process for manufacturing the soil buffer of the present invention consists in treating finely pulverized slag derived from the reverberatory refining of high iron content copper ores with concentrated orthophosphoric acid and subjecting the resultant slag-acid mixture to elevated temperatures for a sufficient time period to cause conversion of all metallic iron and iron oxide originally present in the slag to iron phosphate salts, predominantly as ferrous hydrogen and ferrous dihydrogen orthophosphate compounds. The resultant products, a conglomerate mixture of ferrous iron orthophosphate salts with lesser amounts of metallic phosphate compounds of aluminum, calcium, magnesium, zinc, copper, manganese, and other metals in trace amounts, and silicates of iron, calcium, aluminum and magnesium is cooled to atmospheric temperature and crushed to a size suitable for application to soils.

In order to use the resulting product it need merely be applied to the soil. Thereafter the combination of the moisture and the soluble salts in the soil causes the metal orthophosphate salts in the applied material to be converted first into acidic or akaline phosphate salts depending upon the degree of acidity or alkalinity of the soil before treatment with the products and converted later into orthophosphoric acid and eventually into metallic oxides. A particularly valuable property of the products lies in the ability to be applied to either acidic or alkaline soil systems. This property appears to be based upon the capacity of the metal orthophosphate content in the product to accept acid radicals from acidic soils for conversion into metal acid phosphate compounds, or to accept alkali metal or alkaline earth radicals from alkaline soils for conversion into alkali metal and alkaline earth metal phosphate compounds. This allows the soil treating products to promote an optimum soil pH range (pH 6.8 to 7.2) through "buffering" of either acid or alkaline systems. At the same time, the soil buffer is providing the plant nutrients phosphorus, iron, calcium, magnesium, manganese, zinc, copper and other plant nutrients to the soil system treated.

The slag as indicated above, is a slag obtained from the refining of copper in a reverberatory furnace. When high iron content cooper ores are smelted in such furnaces the iron content of the slag is present as metallic iron, ferrous oxide (FeO), ferric oxide ($Fe_2O_3$), magnetic iron oxide ($Fe_3O_4$), ferrous silicates ($FeSiO_3$), ferrous sulfide (FeS) and as complex silicates of iron and other metallic elements. The total iron content in the slag, is generally between 15% and 35% expressed as metallic iron. In addition the slags usually contain 25% to 40% silica, 8% to 10% lime, 6% to 7% alumina, 1.5% to 2% magnesia, up to 1% manganese oxide, 2% to 3% zinc, 0.3% to 0.5% copper, about 0.6% sulphur, about 0.5% lead and trace amounts of Mo, B, Ni and Cd.

A typical analysis of a composite of ten samples of slag obtained from one source and used in the process hereinafter described had the following composition: iron expressed as Fe, 28.68%; lead, expressed as Pb, 0.49%; copper, expressed as Cu, 0.35%; zinc, expressed as Zn, 2.88%; sulphur, expressed as S, 0.6%; manganese, expressed as MnO, 0.88%; calcium, expressed as CaO, 8.86%; aluminum expressed as $Al_2O_3$, 6.54%, magnesium, expressed as MgO, 1.52%; and silicon dioxide, $SiO_2$, 40.80%.

The following is a detailed example of the process of this invention, for combining a pulverized slag with concentrated orthophosphoric acid and thereafter subjecting the initially reacted constituents to a controlled heat treatment.

Approximately equal parts by weight of orthophosphoric acid (85.8% $H_3PO_4$ density 1.7) and pulverized slag of the above analysis, crushed so that 90% passes a 200-mesh U.S. standard sieve are intimately mixed. This mixing may be accomplished by stirring the acid into the slag or by pug milling or by tumbling the dry slag in a rotating cylinder and spraying the acid onto the tumbling slag or by any other means which results in an intimate mixture of only the slag and orthophosphoric acid. During the initial combining period of the acid with the slag a temperature rise from atmospheric to approximately 200° F. takes places during the first minute and the resultant product within another minute is a solid whose total weight is exactly equal to the combined weights of the slag and the acid with which it was mixed.

The initially combined slag-acid mixure is then heated to approximately 600° F. as it tumbles in a heated rotating cylinder mounted at a slight angle (about 3°) to the horizontal. As the heated cylinder rotates, the desired chemical reactions are completed in the tumbling slag-acid mixture therein and the resulting reaction product is continuously discharged from the inclined cylinder at the same rate as the raw slag-acid mixture enters the cylinder for reaction and heat treatment. After the discharge of the products, the products are cooled to atmospheric temperature, crushed, and sized ready for use.

In a batch process, after the slag and acid are intimately mixed together by stirring in a suitable container, the mixture is heated to a temperature of about 600° F. for completion of the desired chemical reactions which are indicated by total conversion of sulfide sulfur content into sulfur dioxide gas to leave a sulfur dioxide-free, odor-free, light gray product which is allowed to cool before crushing and sizing for use.

The finished product resulting from the processing of an intimate mixture of equal parts by weight of the described slag and 85.8% $H_3PO_4$ content orthophosphoric acid, by heating to a temperature of 600° F. for a time period of 50 minutes, then cooling to 80° F. temperature (atmospheric temperature), and then crushing to pass 20-mesh U.S. standard sieve, had the following properties: odorless; gray in color; a weight per unit volume of 90 lbs. per cubic foot, a pH of 5.9 (pH of 1:10 ratio dilution at 25° C.); and the following approximate chemical composition: 40% as mixed ferrous hydrogen orthophosphates with trace amounts of phosphoric acid, $H_3PO_4$; 35% as mixed orthophosphates of aluminum, calcium, zinc, magnesium, copper, and manganese and iron tri- and polyphosphates; 25% as silica and mixed silicates of iron, calcium, aluminum, and magnesium. Further analysis showed total phosphorus pentoxide, $P_2O_5$, content of approximately 38% (comprising plant available ammonium citrate soluble phosphorus pentoxide, approximately 28% and unavailable phosphorus pentoxide, approximately 10%) soluble and available iron as Fe, approximately 11%.

It must be understood that it is not possible to specify exactly the total and complete chemical reactions taking place between the slag and the orthophosphoric acid because of the intricate complexities of chemical structure of the slag especially of the silicate fractions admixed with the varying metals and metallic oxides present.

Ratio of slag to acid

The 1:1 weight ratio of slag to acid described in the above example may be varied to a limited extent. As the weight of the slag is held constant and the relative proportion of the acid in the mixture is decreased, the value of the resultant product as a soil buffer material decreases because proportionately smaller amounts of orthophosphate salts are necessarily produced. As the proportion of acid is decreased, the resultant product ultimately produced is exceptionally fine in physical size and cannot be applied to the soil by use of conventional application equipment. In addition, ultimately uneconomically large amounts of the product would have to be used to obtain the desired results. On the other hand, as the weight of acid is held constant and the proportion of slag is decreased, both the initial heat of reaction and the degree of reaction are greatly diminished. Instead of a solid, granular-structured product being formed, a gummy mass containing excessive liquid phase results which is both difficult to handle and difficult to heat in the next processing step. The product resulting from use of substantially more acid than that chemically equivalent to the slag, unless heated at very high temperatures or for extensive time periods at high temperatures, will contain unreacted acid. When the product is heated to very high temperatures for conversion of this unreacted acid into phosphorus pentoxide, this extensive heating will cause the formation of higher percentages of undesirable polyphosphate salts and the formation of a higher content of ferric, rather than ferrous, phosphate compounds. In addition, the presence of unreacted phosphoric acid causes the product to be highly acid due to the free acid content and this impairs its ability to be used satisfactorily as a buffer in soil treatment. At the same time, the presence of ferric phosphates and higher percentages of polyphosphates have been found to adversely affect the solubility and buffering action of the product when it is applied to the soil being treated.

While the 1:1 slag-acid weight ratio is preferred because it appears to yield an optimum product, the ratio of slag to acid may be varied between 5 parts by weight of slag to 6 parts by weight of acid and 5 parts by weight of slag to 3 parts by weight of acid, without loss of the desired buffering properties in the product when applied to acid or alkaline soils.

The concentrated acid

Orthophosphoric acid of strengths ranging from 85.8% to 75% have been successfully utilized in the process. The presence of additional uncombined water in the less concentrated acid requires the use of higher temperatures and longer heating periods as compared with the heat treatment necessary when the higher acid concentration is employed, in order to effectively convert the metals and metallic oxides in the slag into the desired orthophosphate salts through reaction with the orthophosphoric acid. Consequently the use of acid of 85.8% strength is preferred.

Temperature

In defining the most suitable temperature to be employed for the heating of the slag-acid mixture after its initial reaction has taken place, reference is first made to the minor content of sulfide sulfur (approximately 0.6%) originally present in the slag. Upon combining the orthophosphoric acid with the slag, the sulfide sulfur (predominantly as ferrous sulfide in the slag) reacts with the acid to produce hydrogen sulfide. The hydrogen sulfide formed then reacts with the oxides. With increase of temperature sulfur dioxide and water vapor are eliminated from the system as gases.

During the heat treatment any reduced iron in the system reacts with the orthophosphoric acid to form ferrous hydrogen orthophosphates and hydrogen. This hydrogen in turn reacts with any magnetic iron oxide present to produce additional $FeHPO_4$ and water which is eliminated during the heating.

The entire process of conversion of the metallic iron and iron oxides of the slag into ferrous orthophosphates is brought about through heating the slag-acid mixture until all sulfide sulfur is converted into sulfur dioxide (gas), while the orthophosphoric acid becomes dehydrated and sulfur dioxide gas and water vapor are driven from the system. Additionally, the formation of orthophosphate of the other metals and metallic oxides present in the slag takes place in a manner similar to that of conversion of iron compounds into the ferrous orthophosphate salts.

Since the melting range of the agglomerate of mixed orthophosphate salts in combination with other compounds of the slag-acid mixture lies in the range of 600° F. to 650°

F., it is desirable to heat the mixture to a temperature of about 600° F.

If heated at lower temperatures the time of heating required must become greater the lower the degree temperature employed. At 400° F., 4 to 5 hours heating fails to yield a complete reaction, while at 300° F. several days are required for the reaction to approximate completion. Above 650° F., a fusion of the slag-acid mixture takes place, resulting in a semi-glassy material of considerable hardness. More importantly, proportionate to the temperature increase is an increase in the amount of so-called "unavailable" $P_2O_5$ formed (phosphate compounds insoluble in ammonium citrate solution are defined as unavailable-to-plant forms of phosphorus).

As a consequence of the foregoing the process is conducted at temperatures between about 575° F. and 625° F. and preferably at about 600° F.

Although the product resulting from the reaction and subsequent heat treatment is relatively insoluble is distilled water, its solubility is increased markedly by the presence of acid, alkali or salts in the water, in comparison with its solubility in salt-free neutral (pH 7) aqueous systems.

This combination of properties of a highly insoluble substance whose solubility increases in the presence of acidic or basic materials and which continuously releases small quantities of available phosphorus, soluble iron, and other plant nutrients from its large reservoir of very slowly soluble orthophosphate salts permits the use of extraordinarily large amounts of the substance on soils in which plants are growing without causing harmful effects to either the plants or to the soil. Extremely beneficial results may be obtained from use of either small or large amounts of the buffer substance, since ordinarily the pH of conventional agricultural soils ranges between pH values of 3.5 to 10.5. The rate of solution and the chemical nature of the solubles released, in addition to acting as a buffering agent, will also provide plant nutrients for very long periods of time, depending upon the amount of substance applied to the soil and the amount of moisture present in such soil system. At the same time, after treatment of the soil with the buffer material, the plant nutrients present in the soil prior to treatment with the buffer substance become increasingly available for plant use. For example, a soil having an initial pH of 9.2 was mixed with an equal part by weight of the soil buffer. Within a 15 day period (with no supplementary fertilization) a bare root plant planted in the mix showed better growth, better color, and a far more healthy appearance than a control plant in the same soil untreated with the buffer substance. The pH of the 50:50 mix of soil and buffer in a 20-day period leveled off at 6.8, while the pH of the untreated soil increased to pH 9.8. Both plants were watered with equal amounts of pH 8.7 water.

Quantities of the soil buffer ranging in amount down to as little as one hundred pounds per acre, when applied within an inch from a seedling plant provide optimum amounts of available phosphorus and soluble iron for stimulation of extremely rapid and good growth, and as the plant roots grow a constant supply of nutrients are available for use in the rooting channels.

Solubility studies conducted on the soil buffer prepared by the above described process showed the following when deionized water was used as the solvent:

0.160 gram of the buffer was soluble in 1000 ml. of water in one hour at 77° F. 0.243 gram were soluble in 1000 ml. of water in one hour at 170° F. 0.200 gram were soluble in 1000 ml. of water in 72 hours at 77° F.; and 0.29 gram were soluble in 1000 ml. of water in seven days at 77° F. Determinations of the phosphorus pentoxide ($P_2O_5$) content present in the water-soluble fractions after one hour exposure were as follows: In the 0.160 gram water soluble, 56% was present as $P_2O_5$; in the 0.243 gram of water soluble, 49% was determined as $P_2O_5$.

The solubility of the same soil buffer in specific concentrations of aqueous solutions, of sodium hydroxide and sulfuric acid was determined to be as follows:

Number of grams soluble in 1000 ml. of solvent in a 2 hr. period at 77° F.

2.268 gm. soluble in 0.200 N NaOH
0.445 gm. soluble in 0.010 N NaOH
0.395 gm. soluble in 0.005 N NaOH
0.028 gm. soluble in 0.00005 N NaOH
1.344 gm. soluble in 0.200 N $H_2SO_4$
0.291 gm. soluble in 0.010 N $H_2SO_4$
0.225 gm. soluble in 0.005 N $H_2SO_4$
0.039 gm. soluble in 0.00005 N $H_2SO_4$ The approximate pH of 0.00005 N sodium hydroxide solution untreated with soil buffer was 9.0. After treatment with ten grams of soil buffer to 1000 ml. of solution, the pH was reduced to 5.8. The approximate pH of the same normality sulfuric acid solution untreated with soil buffer was 4.0. After treatment with ten grams of soil buffer per 1000 ml. of solution, the pH was increased to 5.9. Additional pH studies concerning systems to which one gram of soil buffer material was added to one hundred grams of acidic solutions with a pH of 2.03 gave the following pH changes:

pH after one hour _____ 3.82
pH after 24 hours _____ 4.75
pH after 72 hours _____ 5.07
pH after 144 hours _____ 6.01

When one gram of the soil buffer material was added to one hundred grams of an alkaline system with a pH of 11.80, the following pH changes were observed to have taken place:

pH after one hour _____ 9.33
pH after 24 hours _____ 7.67
pH after 72 hours _____ 7.19
pH after 144 hours _____ 7.01

While not wishing to be bound by any theoretical explanation of the manner in which the novel soil buffer of this invention operates, it appears that in the presence of moisture in the soil acting upon the orthophosphate soil buffer substance, a larger reservoir of portions (predominantly oxonium ions) is made to exist in the form of orthophosphoric acid molecules. At the same time, there is also a large reservoir of phosphate ions which act as proton acceptors. In the presence of strong alkalis, such as sodium hydroxide, the hydroxyl ions of the system will immediately combine with the oxonium ions of the orthophosphoric acid to yield water. But as soon as this occurs, more orthophosphoric acid molecules will ionize to form more oxoniom ions to maintain the equilibrium of the system and cause the pH to shift toward neutrality (pH 7). Similarly, in the presence of free acid, when hydrogen ions are present, the increased concentration of oxonium ions places severe stress on the system, which causes the oxonium ions to combine with some of the large number of phosphate ions present to yield molecular orthophosphoric acid to shift the pH of the system toward neutrality (pH 7), and bring about an almost constant oxonium ion concentration. By means of this common ion effect, it becomes possible to raise or lower and keep in control the prevailing concentration of hydrogen and hydroxyl ions in the system by the use of the mixed orthophosphate soil buffer substance. In acid systems, the following series of equations are illustrative:

(1) $2FeHPO_4 + 2H^+ = Fe(H_2PO_4)_2 + Fe^{+2}$
(2) $Fe(H_2PO_4)_2 + 2H^+ = 2H_3PO_4 + Fe^{+2}$
(3) $FeH_2P_2O_7 + H_2O = FeHPO_4 \cdot H_2O + HPO_3$
(4) $FeHPO_4 + 2H^+ = H_3PO_4 + Fe^{+2}$
(5) $2FeH_2P_2O_7 2H_2O + 2H^+ = FeHPO_4 + 3H_3PO_4 + Fe^{2+}$ In alkaline systems, the following series of equations are illustrative:

(1) $FeHPO_4 + NaOH = NaH_2PO_4 + FeO$
(2) $H_3PO_4 + NaOH = NaH_2PO_4 + H_2O$
(3) $H_3PO_4 + 2NaHO = Na_2HPO_4 + 2H_2O$
(4) $Fe(HPO_4)_2 + CaCO_3 = Ca(HPO_4)_2 + FeO + CO_2$
(5) $2H_3PO_4 + Ca(OH)_2 = Ca(H_2PO_4)_2 + 2H_2O$
(6) $3H_3PO_4 + Na_2HPO_4 + 2NaHCO_3 = 4NaH_2PO_4 + 2H_2O + 2CO_2$
(7) $FeH_2P_2O_7 + 2NaOH = 2Na_2H_2P_2O_7 + FeO + H_2O$

As is well known, soil systems are extremely complex and to illustrate even partially the complex chemistry of any soil system by use of chemical equations is not feasible. Thus it must be understood the soil equations shown are offered only to theoretically illustrate a small portion of the chemistry believed from experimental studies to occur when the invented soil buffer substance is incorporated into soil systems.

Having now described the invention in accordance with the patent statutes, it is not intended that it be limited except as may be required by the appended claims.

What is claimed as new is as follows:

1. A process for making a soil fertilizing and soil buffering product which comprises: intermixing concentrated orthophosphoric acid with a slag obtained from the process of refining high iron content copper ores in a reverberatory furnace, said intermixing being effected in the absence of any extraneous additional water other than the water present in said acid, and the weight ratio of slag to acid is between 3 and 6 parts by weight of acid for each 5 parts by weight of slag and the concentration of the orthophosphoric acid is between 75% and 85.8%; and promptly thereafter, after the initial reaction between the acid and slag, heating the initially reacted materials to a temperature between 300° F. and about 650° F. and below the sintering temperature of said materials and maintaining said materials at said temperature for a time sufficient for all of the sulfur present to be eliminated from said heated initially reacted materials as sulfur dioxide and recovering the resulting soil fertilizing and soil buffering reaction product from which the sulfur has been expelled as sulfur dioxide and in which the iron in the mixture has been converted into ferrous orthophosphate.

2. The process of claim 1 wherein the slag is in the form of particles at least about 90% of which will pass a 200-mesh, U.S. Standard sieve.

3. A process for making a soil fertilizing and soil buffering product which comprises: intermixing concentrated orthophosphoric acid with slag obtained from the process of refining high iron content copper ores and a reverberatory furnace said intermixing being in the absence of any extraneous additional water other than the water present in said acid, and the weight ratio of slag to acid is between 3 and 6 parts by weight of acid for each 5 parts by weight of slag and the concentration of the orthophosphoric acid is between 75% and 85.8%; and promptly thereafter, after the initial reaction between the acid and slag, heating the initially reacted materials to a temperature between 300° F. and about 650° F. and below the sintering temperature of said material and maintaining said materials at said temperature for a time sufficient for all of the sulfur present to be eliminated as sulfur dioxide from said heated initially reacted material; said slag containing between 15% and 35% by weight of iron and iron compounds, expressed as Fe, between 25% and 40% of silica, 8 to 10% calcium oxide, 6 to 7% alumina, 1.5 to 2% magnesia, up to about 1% MnO, 2–3% zinc, 0.3–0.5% copper, about 0.6% sulfur, about 0.5% of lead and traces of Mo, B, Ni and Cd; and the concentrated phosphoric acid having a strength between about 75% and 85.8% and recovering the resulting soil fertilizing and soil buffering reaction product from which the sulfur has been expelled as sulfur dioxide and in which the iron in the mixture has been converted into ferrous orthophosphate.

4. The process of claim 1 in which the weights of slag and concentrated orthophosphoric acid which are intermixed are approximately equal.

5. The process of claim 1 wherein the temperature is between 575° C. and 625° C. and is below the sintering temperature.

References Cited by the Examiner

UNITED STATES PATENTS

| | | | |
|---|---|---|---|
| 1,518,571 | 12/24 | Cowles | 71—63 |
| 2,532,548 | 12/50 | Heide | 71—63 |
| 2,741,876 | 4/56 | Paoloni | 71—63 |
| 2,903,349 | 9/59 | Bryant | 71—62 |
| 2,920,950 | 1/60 | Heise et al. | 71—63 |
| 2,927,851 | 3/60 | Wilson | 71—62 |
| 2,970,049 | 1/61 | Dalton | 71—63 |

DONALL H. SYLVESTER, *Primary Examiner.*
ANTHONY SCIAMANNA, *Examiner.*